March 31, 1942. L. M. BAKER 2,278,344
LOCK BOLT CONSTRUCTION
Filed May 6, 1940
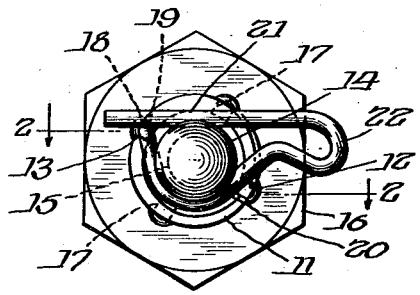
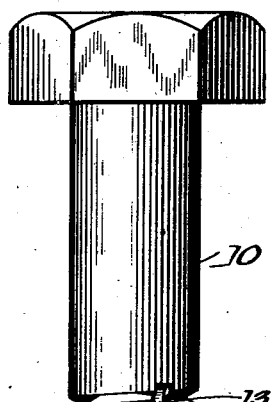
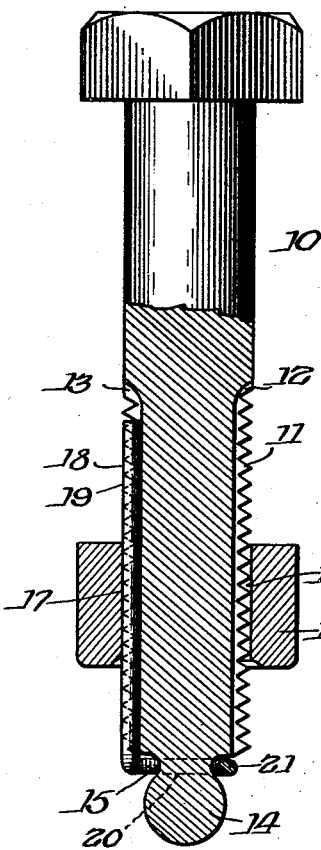
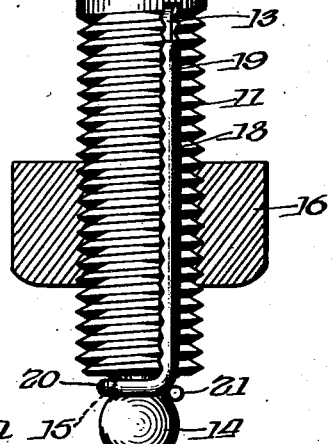
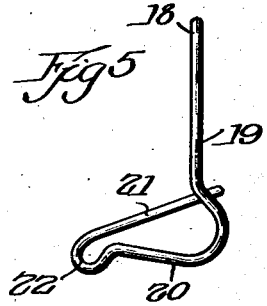
Inventor:
Leslie M. Baker Patented Mar. 31, 1942

2,278,344

UNITED STATES PATENT OFFICE 2,278,344

LOCK BOLT CONSTRUCTION

Leslie M. Baker, Evanston, Ill.

Application May 6, 1940, Serial No. 333,509

3 Claims. (Cl. 151—8)

My invention relates to a locking bolt and has particular reference to a bolt and nut combination with a key adapted to be inserted in registering slots formed in the threaded portion of the bolt and extending transversely through the nut, the key having a looped end portion adapted to fit over the ball end formed on the bolt so that the nut is held in threaded engagement with the bolt without danger of loosening or backing off.

Another object of my invention is the provision of a locking bolt having a key formed with a looped end portion adapted to be fiitted over the end of the bolt which is especially fashioned with a ball end, so that the key holding the nut against rotation on the threaded portion of the bolt is held firmly in position, and can be easily removed with the fingers of the operator and the nut turned on or off the bolt with the use of the ordinary wrench, as is usual with bolts of this type and character.

Another and further object of my invention is the provision of a locking bolt which is extremely simple and inexpensive to manufacture, and does not depend for its efficiency upon locking washers placed under tension, which ultimately lose their elastic properties due to the fatigue of the metal, thereby allowing the nut to loosen.

Another and further object is the provision of a locking nut and bolt provided with a plurality of channels on the threaded portion of the bolt open at their outer sides, with a plurality of channels in the nut opening out into the opening through the nut, so that one pair of slots may be brought into register with each other with at least each quarter turn of the nut, and thereafter locked in position so that the bolt does not need to be put under excessive strain in order to keep it tight in position.

These and other objects of my invention will be more fully and better understood by reference to the accompanying sheet of drawings, and in which—

Figure 1 is an end elevational view of my improved bolt construction;

Figure 2 is a side view partially in elevation and partially in section of a bolt embodying my invention;

Figure 3 is a side view showing the bolt in elevation and the nut in section, with the locking key in position in the bolt;

Figure 4 is an elevational view of a nut embodying my invention; and

Figure 5 is an elevational view of the locking key used in the lock combination.

Referring now speciafically to the drawing, and in which like reference characters refer to like parts throughout, a bolt 10 is shown having the usual threaded portion 11 thereon and formed with a pair of longitudinally extending, outwardly opening slots 12 and 13, these slots extending from the end of the bolt to the shank thereof throughout the threaded portion of the bolt. A ball-shaped end 14 is provided on the bolt, having a neck portion 15 connecting the ball end 14 with the main body of the bolt, this ball end forming the holding member for the locking element hereinafter described.

The usual nut 16 is provided, threaded in the usual manner and provided with inwardly opening channels 17, 17 around the inner periphery of the threaded portion of the nut 16. These channels are located preferably 90° apart on the nut so that only a quarter turn is necessary to bring one of them into register with one of the channels 12 or 13 extending through the threaded portion of the bolt 10.

A locking member 18 is provided having a shaft portion 19, a head portion 20 formed into a loop at one side thereof, and a portion 21 opposite the portion 20, with a loop 22 joining the portions 20 and 21 at one side of the head portion forming a fingerpiece for the insertion and removal of the locking member. The head portion 20 of the member 18 is preferably made of spring wire so that the portions 20 and 21 are movable with respect to each other and can pass over the ball end 14 of the bolt and grip the neck portion 15. The locking member 18 is thus securely held in position, with the shaft portion 19 placed in one of the registering slots 17 in the nut 16 and one of the slots 12 or 13 in the bolt, depending upon which of these slots is in convenient register when the nut is drawn on the bolt to the tightness desired. The shaft portion of the locking member is sufficiently large so that it extends partially into each of the slots.

In the use of the device, the nut is placed upon the bolt in the usual manner and tightened thereon to the degree desired, making sure that one of the slots 17 is in register with one of the slots 12 or 13 in the bolt. The shaft portion 19 of the locking member 18 is then placed into the registering slots on the nut and bolt and the head 20 slipped over the ball 14 on the bolt, thereby locking the member 18 in position upon the bolt.

When it is desired to remove the nut from the bolt the members 20 and 21 can be sufficiently separated to allow the holding member to pass over the ball end 14 of the bolt, either through the use of pliers or by the fingers of the operator, and the member 18 withdrawn from the slots in which it is located on the bolt. The nut is then removed in the usual manner.

It will be understood that the shaft portion 19 of the locking member 18 is sufficiently large so that when it is inserted into the registering slots 12 or 13 on the bolt and the slots 17 in the nut, it occupies a position partially in each of these slots, preventing any movement of the nut on the threads of the bolt by reason of the ends of the threads on the nut engaging against the shank portion 19 of the locking member 18.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. A lock bolt comprising in combination, a bolt having an open channel extending longitudinally thereof at its threaded portion and having a ball end portion, a nut having an open channel extending longitudinally thereof in communication with the opening through the nut, and a locking member having a shaft portion adapted to be inserted into the registering channels of the bolt and nut and having a head portion formed with a loop on one side and a free end portion passing across the said loop, the said loop and free end portion seating in the channel between the ball end portion and the threaded portion of the bolt on opposite sides of said bolt.

2. A lock bolt comprising in combination, a bolt having an open channel extending longitudinally thereof at its threaded portion and having a ball end portion, a nut having an open channel extending longitudinally thereof in communication with the opening through the nut, and a locking member having a shaft portion adapted to be inserted into the registering channels of the bolt and nut and having a looped end, the looped end being adapted to pass over the said ball end and seat between the said ball end and the body of the bolt.

3. A lock bolt comprising in combination, a bolt having a threaded shank portion and having a rounded end and a neck portion between said shank and the end, a longitudinally extending open channel in the shank portion on the said threaded end, a nut having an opening therethrough and internally threaded with a longitudinal channel therein, and a locking member having a shank portion extending into the registering channels on said bolt and said nut, and a head portion angularly disposed with respect to said shaft portion comprising leg members adapted to seat in the neck portion on each side thereof.

LESLIE M. BAKER.